April 20, 1926.
A. STEINLE
MACHINE FOR CUTTING NONCIRCULAR GLASSES
Filed August 7, 1923
1,581,883
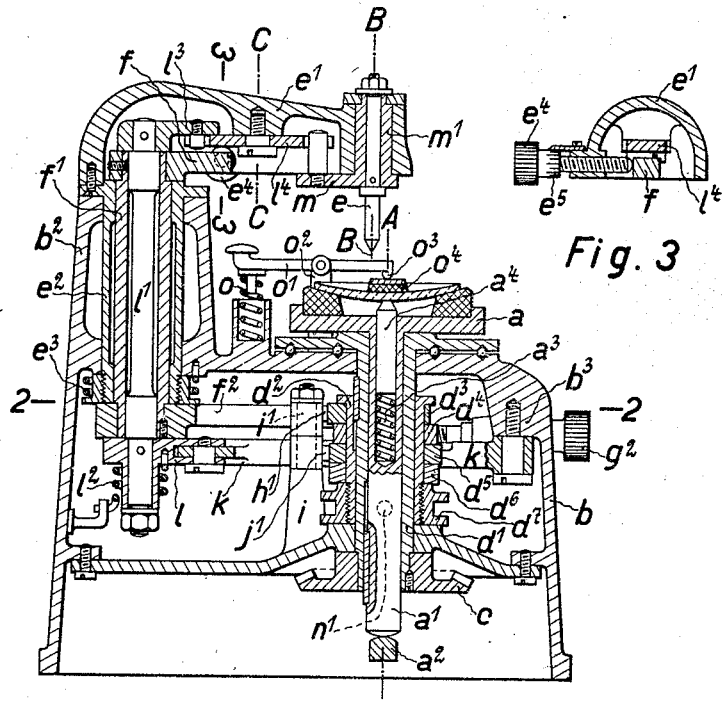
Fig. 1
Fig. 3
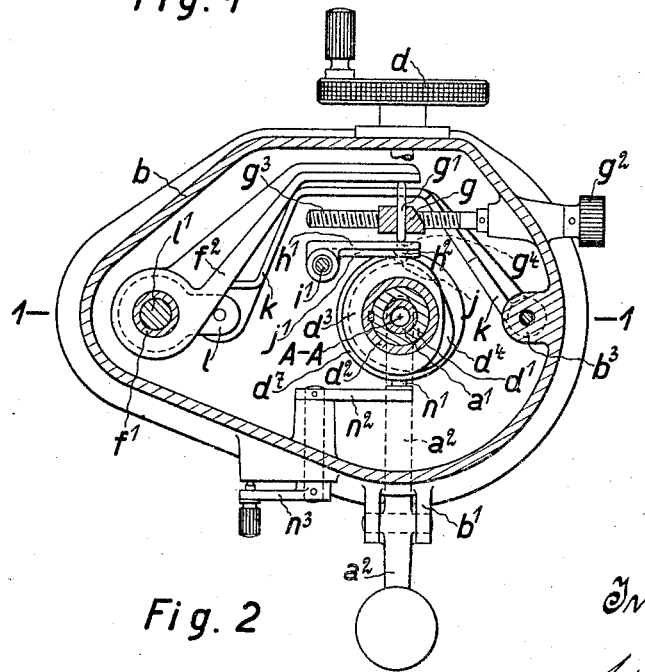
Fig. 2
Inventor:
Adolf Steinle Patented Apr. 20, 1926.

1,581,883

UNITED STATES PATENT OFFICE.

ADOLF STEINLE, OF JENA, GERMANY, ASSIGNOR TO THE FIRM OF CARL ZEISS, OF JENA, GERMANY.

MACHINE FOR CUTTING NONCIRCULAR GLASSES.

Application filed August 7, 1923. Serial No. 656,258.

*To all whom it may concern:*

Be it known that I, ADOLF STEINLE, a citizen of Germany, and residing at Jena, Germany, have invented a new and useful Machine for Cutting Noncircular Glasses (for which I have filed an application in Germany, on August 17, 1922), of which the following is a specification.

In the machines according to the U. S. Patent 1,418,492, which are destined for cutting noncircular glasses, especially spectacle glasses, the glass to be cut is rotated and the cutting tool is moved substantially radially to the axis of rotation of the work-table by a lever operated by a cam. Besides, in order to be able to attain different radial differences, the ratio of gearing of the lever is variable by means of a gear. According to the present invention these machines are improved by providing a second lever controlled by a cam which lever brings about, while cutting, a rotation of the cutting tool about an axis parallel with that of the work-table and by using simultaneously the gear, serving for changing the ratio of gearing between the cam of the first-named lever and the cutting tool, for changing the ratio of gearing between the cam of the second lever and the cutting tool. With a corresponding construction of the cam for the second lever and a corresponding arrangement of this lever, the knife-edge of the cutting tool, having generally the shape of a straight edge, can be maintained tangent to the outline of the glass to be cut.

If it be desired to be able to cut with a machine according to the present invention glasses of different shape, e. g. at option glasses of elliptic or pantoscopic shape, it is preferable, in order to attain a simplified construction, instead of providing for interchange of several cams, to couple from the outset all cams in question with the machine and to provide a change of the levers to the corresponding cams, e. g. by rendering the cams displaceable in the direction of their axis of rotation.

In the accompanying drawing the subject of the invention is illustrated by a constructional example. Fig. 1 shows a section through the axis of rotation of the work-table on line 1—1 of Fig. 2, Fig. 2 a section perpendicular thereto on the line 2—2 of Fig. 1 and Fig. 3 a section on the line 3—3 of Fig. 1.

The work-table $a$ of this machine, which is supported rotatably about an axis A—A within a casing $b$, is actuated from a hand wheel $d$ by means of two bevel wheels, of which only the one, $c$, is visible in the drawing. The bevel wheel $c$ visible in the drawing, whose diameter of the pitch circle is twice as large as that of the associated invisible wheel, is fixed on a hollow shaft $d^1$ through which a cylindrical extension $a^1$ of the table $a$ is passed through in such a way as to be displaceable in the longitudinal direction but not rotatable relatively to the hollow shaft $d^1$. Against the bottom part of this extension $a^1$ there is adapted to contact a lever $a^2$ which is rotatably supported in lugs $b^1$ of the casing $b$ and which serves for pressing the table $a$ with the work piece against the cutting tool, while the table is rotated by the hand wheel $d$. On the hollow shaft $d^1$ there are further fixed, by interposing a bushing $d^2$ which is displaceable on the hollow shaft $d^1$ in the longitudinal direction, four cams $d^3$, $d^4$, $d^5$ and $d^6$, of which in Fig. 2, in order to maintain the distinctness, only the two upper ones $d^3$ and $d^4$ are shown. The cutting tool $e$ is supported in an arm $e^1$ rotatable about an axis B—B. The arm $e^1$ is rigidly connected to a hollow axis $e^2$ rotatably supported in a superstructure of the casing $b$ which axis is under the action of a spring screw $e^3$, fixed with its one end on the casing $b$, in such a way that the free end of the lever $e^1$ and thereby the cutting tool $e$, as viewed in Fig. 1, tends to move forward out of the drawing plane. Under the action of this spring the arm $e^1$ bears with an adjustable screw $e^4$, provided with a scale $e^5$, against a stop $f$. The latter is fixed on the top of a bush $f^1$ which is rotatably guided through the hollow axis $e^2$ and carries at its bottom end a finger $f^2$. The free end of this finger bears (owing to the action of the spring $e^3$) against a pin $g^1$ which is supported in a nut $g$ so as to be freely movable in its longitudinal direction and which bears in its turn against a lever $h^1$. The nut $g$ rests upon a screw spindle $g^3$ which is supported in the casing $b$ and adjustable from outside by means of a milled head $g^2$. The lever $h^1$, which at its one end is supported on a standard $i$ rotatably about a bolt $i^1$, bears with a nose $h^2$ against the periphery of the cam $d^3$. The latter thus forms with the adjustment, shown in the drawing, of the machine the guide-member for the radial movement of the cutting tool $e$. The lever $h^1$ serves as a mediator of this motion between the guide-member and the cutting tool. As a gear for changing this ratio of gearing the screw $g^2$, $g^3$ with the nut $g$ and the pin $g^1$ are employed. As may easily be seen, in the position of the nut $g$ shown the pin $g^1$ moves to and fro in the longitudinal direction by the same amount by which the point of the periphery of the cam $d^3$ being at any one time in contact with the nose $h^2$ of the lever $h^1$ approaches the axis A—A or by which amount this point recedes from it. However, if by rotating the screw $g^2$, $g^3$ the pin $g^1$ approaches the point of rotation of the lever $h^1$, the corresponding tracks of the pin $g^1$ and thereby also those of the cutting tool in the radial direction become smaller than before and they become zero if the pin $g^1$ comes to lie above the bolt $i^1$, so that in this position, perfectly round glasses can be cut with the machine. In the present machine in which the tool is not straight-guided but turns about the hollow axis $e^2$ the motion of the cutting tool is, of course, not exactly radially directed but only deviates to a small extent from the exact radial motion. With the adjustment, shown in the drawing, of the machine the rotary motion of the cutting tool $e$ about the axis B—B is effected by the cam $d^5$. On the latter rests with a nose $j$ a lever $j^1$ which is of similar shape as the lever $h^1$ and which is rotatable like the latter about the bolt $i^1$. Against the lever $j^1$ bears a pin $g^4$ which, like the pin $g^1$, is supported in the nut $g$ freely movable in its longitudinal direction. The end of the pin $g^4$, away from the lever $j^1$, is in contact with a bow $k$ which, on the one hand, is rotatably supported in a lug $b^3$ of the casing $b$ and which, on the other hand, is hingedly fixed to a finger $l$ fitted to the bottom end of a bolt $l^1$. The latter which is rotatably supported in the bushing $f^1$ is so acted upon by a spring screw $l^2$, that the bow $k$ is continuously pressed against the pin $g^4$. At its top end the bolt $l^1$ carries at a stud $l^3$ which engages with an intermediate lever $l^4$ bifurcated at both ends which lever is rotatable about an axis C—C and which, in its turn, coacts with a finger $m$ of a bush $m^1$ which is rotatably supported in the arm $e^1$ about the axis B—B and in which the cutting tool $e$ is fixed. On the bush $d^2$ there is furthermore fixed a ring $d^7$ provided with a recess in which engages the pivot $n^1$ of a crank $n^2$, supported in the wall of the casing $b$. Outside the latter the crank $n^2$ carries an adjustable lever $n^3$ which admits of being brought into two resting positions. The crank $n^2$ serves for bringing the desired cam into the requisite working position. As already mentioned, in the adjustment shown the cams $d^3$ and $d^5$ are in the working position in which pantoscopically-shaped and round glasses can be cut. In the second resting position the cams $d^4$ and $d^6$ are then in the working position which admits of cutting elliptic and round glasses. For fixing the work piece upon the work-table there is provided a lever $o^1$ acted upon by a spring $o$. This lever is rotatably supported in a standard $o^2$, fixed on the casing $b$ laterally of the work piece, and presses with a spherical extension $o^3$ against a cushion $o^4$ rotating with the work piece. For simplicity's sake the work piece $e$ is shown as consisting of a single piece, while in fact it is also provided in the usual way with a link in order to be able to always direct it, when cutting meniscal glasses, as far as possible perpendicularly to the surface to be cut. In conclusion it may be mentioned that the work-table $a$ is provided with a centering point $a^4$ which is under the action of a spring $a^3$.

If it be desired to cut a spectacle glass with the aforesaid machine, it is first necessary to bring the adjustable lever $n^3$ into the resting position corresponding to the desired glass shape. Hereupon the machine is adjusted, by rotating the milled head $g^2$, to the desired radial difference and, by rotating the screw $e^4$, to the desired size of the spectacle glass. Then one clamps the glass on the work-table $a$, whereby it is centered by means of the point $a^4$, and imparts to the hand wheel $d$ two revolutions, whilst the glass is being pressed against the cutting tool with the aid of the lever $a^2$.

I claim:

1. In a machine for cutting non-circular glasses, especially spectacle glasses, a work-table, means for rotating the table, a cutting tool, a member adapted to guide this tool in a plane perpendicular to the axis of rotation of the table, the tool being disposed on this member rotatably about an axis parallel to the first-named axis, two levers, two cams operatively connected with the said means for rotating the table, each cam being adapted to guide one of the said levers, of which levers the first one is adapted to move the cutting tool to and from the axis of rotation of the table and the second one is adapted, while cutting is carried out, to rotate the cutting tool about an axis parallel to this axis, and mechanism to simultaneously vary the amount of movement transmitted between the cam of the first-named lever and the cutting tool and between the cam of the second lever and the cutting tool.

2. In a machine according to claim 1, wherein a plurality of cams for each lever are provided together with means for simultaneously moving said cams to bring a selected pair into operative position.

ADOLF STEINLE.